US010965871B2

(12) United States Patent
Song et al.

(10) Patent No.: US 10,965,871 B2
(45) Date of Patent: Mar. 30, 2021

(54) APPARATUS AND METHOD FOR COMPENSATING FOR IMAGE CHANGE CAUSED BY OPTICAL IMAGE STABILIZATION MOTION

(71) Applicant: Samsung Electronics Co., Ltd., Suwon-si (KR)

(72) Inventors: Won Seok Song, Suwon-si (KR); Nak Hoon Kim, Suwon-si (KR); Jae Mu Yun, Hwaseong-si (KR); Bo Hee Lee, Suwon-si (KR); Hak Jae Jeon, Incheon (KR); Min Heu, Seoul (KR); Byung Ho Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/767,444

(22) PCT Filed: Sep. 11, 2018

(86) PCT No.: PCT/KR2018/010629
§ 371 (c)(1),
(2) Date: May 27, 2020

(87) PCT Pub. No.: WO2019/142997
PCT Pub. Date: Jul. 25, 2019

(65) Prior Publication Data
US 2020/0404182 A1 Dec. 24, 2020

(30) Foreign Application Priority Data

Jan. 19, 2018 (KR) .................. 10-2018-0006969

(51) Int. Cl.
*H04N 5/232* (2006.01)
*H04N 1/327* (2006.01)
*G06T 5/00* (2006.01)

(52) U.S. Cl.
CPC ..... *H04N 5/23287* (2013.01); *H04N 5/23258* (2013.01); *H04N 5/23293* (2013.01)

(58) Field of Classification Search
CPC ........... H04N 5/23287; H04N 5/23258; H04N 5/23293; H04N 5/2328; H04N 5/23254;
(Continued)

(56) References Cited

U.S. PATENT DOCUMENTS 8,009,971 B2   8/2011  Koo et al.
8,743,219 B1*  6/2014  Bledsoe ............. H04N 5/23258
                                                348/208.4
(Continued)

FOREIGN PATENT DOCUMENTS

KR    10-0819301 B1    4/2008
KR    10-1502864 B1    3/2015
(Continued)

*Primary Examiner* — Marly S Camargo
(74) *Attorney, Agent, or Firm* — Jefferson IP Law, LLP

(57) ABSTRACT

An electronic device is disclosed. Moreover, various embodiment found through the disclosure are possible. An electronic device may include a lens assembly including, one or more lenses, an image sensor, an image stabilizer, and a processor. The lens assembly may be arranged to from a first angle between an optical axis of at least some lenses of the one or more lenses, and a surface of the image sensor. The processor may be configured to change an angle of the lens assembly through the image stabilizer in response to shaking of the electronic device, obtain an image through the image sensor, in a state that the angle of the lens assembly is changed, correct, based at least on the first angle and a second angle corresponding to the changed angle of the lens assembly, at least a portion of the image, which is distorted, by the second angle, and display the corrected image through a display electrically connected with the electronic device.

15 Claims, 13 Drawing Sheets

(58) Field of Classification Search
CPC . H04N 1/327; H04N 1/32789; H04N 1/32791
USPC ..... 348/208.2, 208.99, 208.4, 208.5, 208.08,
348/208.11, 208.12, 208.13, 208.16,
348/333.02, 335, 345, 344; 396/13, 52,
396/55, 421; 382/255
See application file for complete search history.

(56) References Cited

U.S. PATENT DOCUMENTS

| | | |
|---|---|---|
| 9,124,806 B1 | 9/2015 | Kang |
| 9,225,901 B2 | 12/2015 | Shibata |
| 9,413,962 B2 | 8/2016 | Tsubaki |
| 9,467,623 B2 | 10/2016 | Hyun et al. |
| 10,038,850 B2 * | 7/2018 | Kartunen ............. H04N 5/2328 348/208.9 |
| 10,044,937 B2 | 8/2018 | Yun |
| 10,075,639 B2 | 9/2018 | Jeong |
| 10,194,090 B2 * | 1/2019 | Matsuno ............ H04N 5/23296 348/240.1 |
| 10,498,965 B2 * | 12/2019 | Fukai ................. H04N 5/23284 348/208.2 |
| 2010/0245603 A1 * | 9/2010 | Hashi ................. H04N 5/23258 348/208.5 |
| 2012/0307089 A1 * | 12/2012 | Rukes .................. H04N 5/2328 348/351 |
| 2017/0126978 A1 * | 5/2017 | Yun ...................... H04N 5/2328 348/208.2 |
| 2019/0206013 A1 * | 7/2019 | Okuyama .......... H04N 5/23203 348/222.1 |

FOREIGN PATENT DOCUMENTS

| | | |
|---|---|---|
| KR | 10-2015-0053495 A | 5/2015 |
| KR | 10-2015-0096902 A | 8/2015 |
| KR | 10-2016-0073613 A | 6/2016 |
| KR | 10-1657283 B1 | 9/2016 |
| KR | 10-2017-0050912 A | 5/2017 |

\* cited by examiner

APPARATUS AND METHOD FOR COMPENSATING FOR IMAGE CHANGE CAUSED BY OPTICAL IMAGE STABILIZATION MOTION

TECHNICAL FIELD

Embodiments disclosed in the disclosure relate to an apparatus and a method for compensating the variation of images caused by optical image stabilization (OIS) motion.

BACKGROUND ART

An electronic device may obtain an image distorted when a problem, such as the handshaking of a user, is caused during the shooting of the image. The electronic device may perform image correction to compensate for the handshaking of the user. The image correction may include, for example, optical image stabilization (OIS) correction.

The OIS correction may refer to correction that a stabilizer moves a lens or an image sensor in a direction of compensating for the shaking of the electronic device when the shaking of the electronic device occurs while the camera module is capturing an image. The motion of the lens or the image sensor through the OIS correction may be referred to as the OIS motion.

DISCLOSURE

Technical Problem

Although the compensating for the shaking of the electronic device is achieved through the OIS correction, when an angle of the lens is changed, an angle formed between an optical axis of the lens and the image sensor may be changed to cause an artifact by the changed angle within the image. The phenomenon, in which the artifact is caused within the image due to the OIS correction, may be referred to as "wobbling".

Various embodiments of the disclosure are to provide an apparatus for measuring an angle of a lens, which is changed due to the OIS correction, and compensating for distortion caused by the OIS correction using the measured angle, and a method for the same.

Technical Solution

According to an embodiment disclosed in the disclosure, an electronic device may include a lens assembly including one or more lenses, an image sensor, an image stabilizer, and a processor. The lens assembly may be arranged to from a first angle between an optical axis of at least some lenses of the one or more lenses, and a surface of the image sensor. The processor may be configured to change an angle of the lens assembly through the image stabilizer in response to shaking of the electronic device, obtain an image through the image sensor, in a state that the angle of the lens assembly is changed, correct, based at least on the first angle and a second angle corresponding to the changed angle of the lens assembly, at least a portion of the image, which is distorted, by the second angle, and display the corrected image through a display electrically connected with the electronic device.

According to an embodiment disclosed in the disclosure, an electronic device may include an image sensor, a lens assembly including one or more lenses, disposed above the image sensor to have a first specified angle between at least some lenses of the one or more lenses and a surface of the image sensor to provide an image to the image sensor such that the image sensor obtains the image at the first specified angle, an image stabilizer which is able to correct at least partially shaking of the electronic device by changing an angle formed between the optical axis and the surface of the image sensor, and a processor. The processor may be configured to change the angle of the lens assembly to a second specified angle depending on the shaking, using the image stabilizer, obtain an image of an external object at the second specified angle using the image sensor, correct, based partially on the first specified angle and the second specified angle, at least a portion of the image distorted by the second specified angle, and display the corrected image through a display electrically connected with the electronic device.

According to an embodiment disclosed in the disclosure, a method of an electronic device may include changing an angle of a lens assembly, to change a first angle between an optical axis of at least some lenses and a surface of an image sensor, in response to shaking of the electronic device, obtaining an image through the image sensor, after changing the angle of the lens assembly, correcting at least a portion of the image distorted by the second angle, based on the first angle and the second angle corresponding to the angle of the changed angle of the lens assembly, and displaying the corrected image through a display electrically connected with the electronic device.

Advantageous Effects

According to embodiments disclosed in the disclosure, the electronic device may measure the motion of the lens, which is caused due to the OIS correction, thereby compensating for image distortion caused by the OIS correction.

According to embodiments disclosed in the disclosure, the electronic device may improve the performance of the camera module by compensating for the image distortion caused by the OIS correction.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
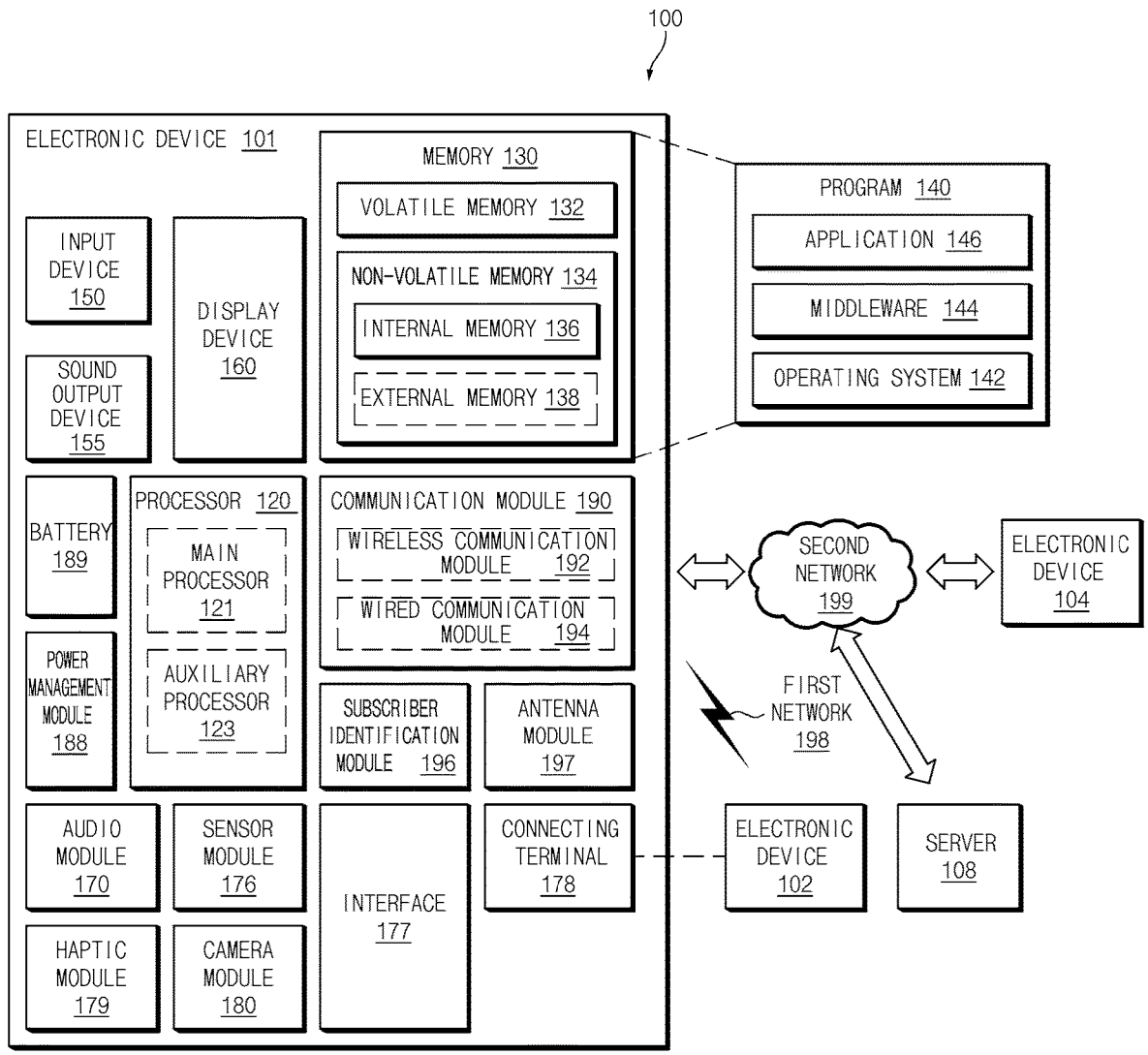
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
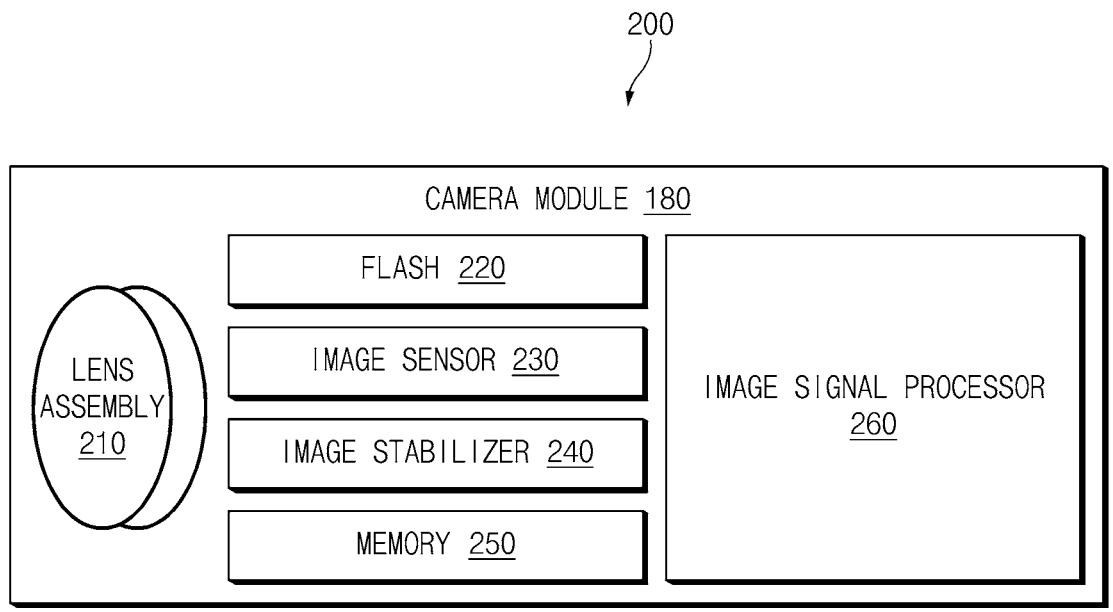
FIG. 2 is a block diagram of a camera module, according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
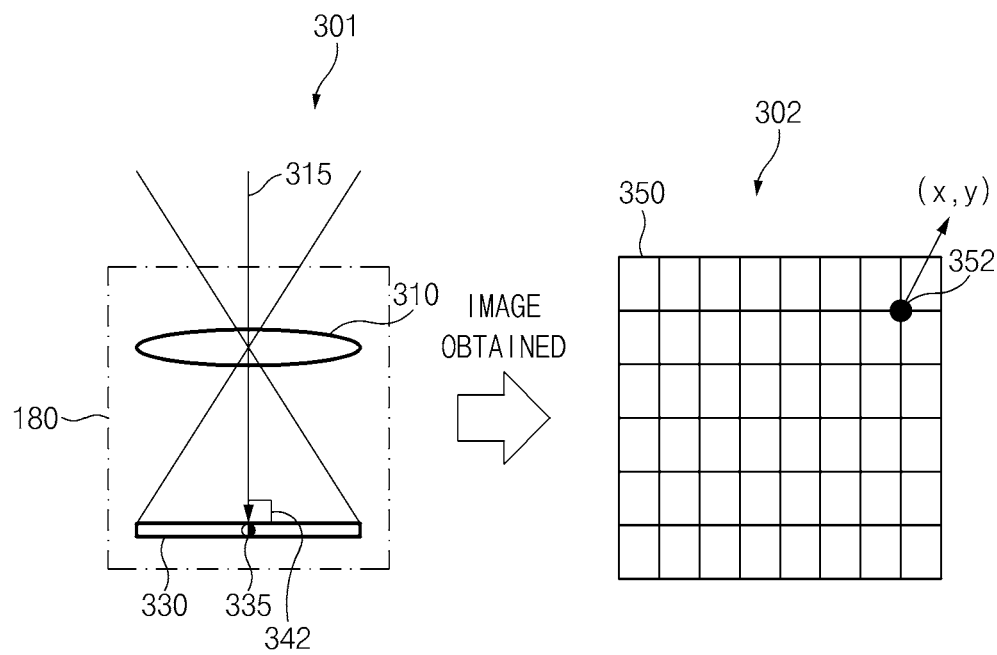
FIG. 3A illustrates an operation of obtaining an image in a state that optical image stabilization correction is not performed, according to various embodiments.

FIG. 3A illustrates an operation of obtaining an image in a state that optical image stabilization (OIS) correction is not performed, according to various embodiments.

Referring to reference number 301 of FIG. 3A, the camera module 180 may include a lens 310 (e.g., at least some lenses of the lens assembly 210 of FIG. 2) and an image sensor 330 (e.g., the image sensor 230 of FIG. 2). Although FIG. 3A illustrates that the camera module 180 merely includes the lens 310 and the camera module 180, the camera module 180 may further include other components not illustrated in FIG. 3A. For example, the camera module 180 may further include a motion sensor, which detects the shaking of the electronic device 101, inside or outside the camera module 180, or a Hall sensor which senses the motion of the lens 310. For another example, the camera module 180 may further include an image stabilizer (e.g., the image stabilizer 240 of FIG. 2) which controls the motion of the lens 310.

According to an embodiment, the lens 310 may collect light reflected from a subject and transmit the light to the image sensor 330. The image sensor 330 may obtain an image by converting the light transmitted from the lens 310 into an electrical signal.

According to an embodiment, the lens 310 may be arranged such that an optical axis 315 of the lens 310 is positioned at the center (e.g., reference numeral 335) of the image sensor 330 and the angle formed between the optical axis 315 and the image sensor 330 is a first angle 342 (e.g., a right angle). In the state that the lens 310 is arranged at the angle and in the direction as illustrated in reference numeral 301, the light reflected from the subject may be transmitted to the image sensor 330 through the lens 310.

Referring to reference numeral 302 of FIG. 3A, the image sensor 330 may generate an image 350 using the light received from the lens 310. The image 350 may include a plurality of pixels. The electronic device 101 may convert the pixels into two dimensional coordinates so as to transform or compensate the image. For example, the electronic device 101 may convert an index of a pixel, which is positioned in reference numeral 352, into two dimensional coordinates (x, y).

Figure 3B:
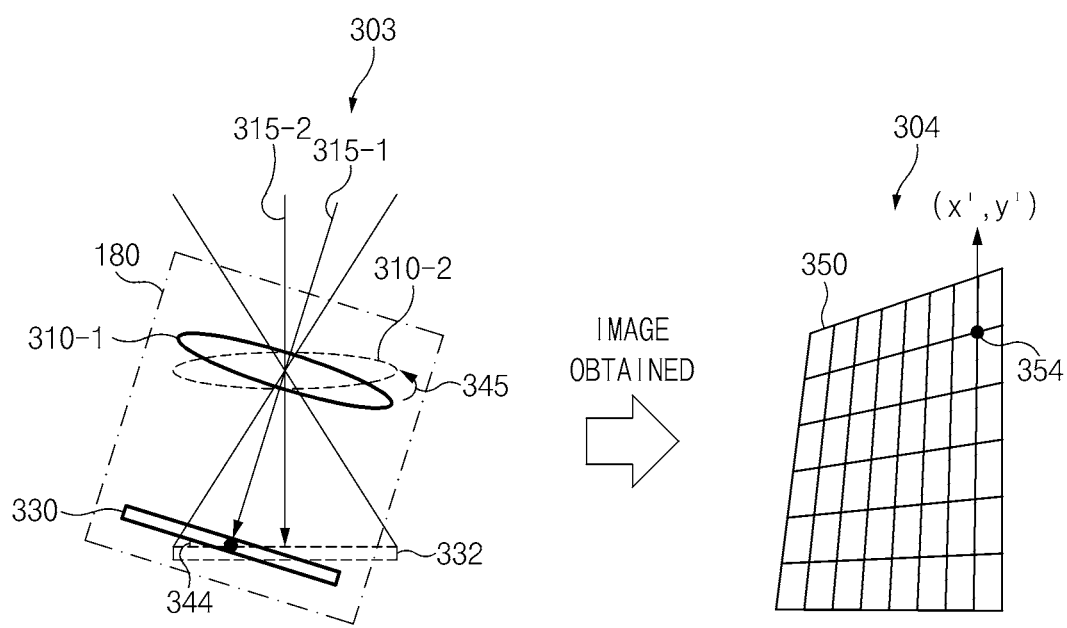
FIG. 3B illustrates an operation of obtaining an image while OIS correction is performing, according to various embodiments.

FIG. 3B illustrates an operation of obtaining an image while OIS correction is performing, according to various embodiments. In FIG. 3B, it may be assumed that the electronic device 101 is shaken by the handshaking of a user or another cause, when the electronic device 101 is in a shooting mode to obtain the image.

Referring to reference numeral 303 of FIG. 3B, when the camera module 180 is shaken in a direction the same as a direction in which the electronic device 101 is shaken, the image sensor 330 and the lens 310 may be shaken in the same direction. The image stabilizer (e.g., the image stabilizer 240 of FIG. 2) may control the motion of the lens 310 such that the lens 310 moves in a direction opposite to the direction in which the electronic device 101 is shaken. For example, the lens 310 may move in the direction illustrated in reference numeral 345 under the control of the image stabilizer. The operation that the lens 310 moves under the control of the image stabilizer may be referred to as the OIS correction.

According to an embodiment, when the lens 310 moves, the optical axis 315 may move by an angle at which the lens 310 moves. For example, an optical axis 315-1 may correspond to the lens 310 (e.g., a lens 310-1) before the OIS correction is performed, and an optical axis 315-2 may correspond to the lens 310 (e.g., the lens 310-2) after the OIS correction is performed. When the optical axis 315 moves, because the optical axis 315 deviates from the center of the image sensor 330, an image of the subject may be distorted by the angle at which the lens 310 (or the optical axis 315) moves. In the disclosure, the angle corresponding to the moving of the lens 310 due to the OIS correction may be referred to as a second angle or OIS motion. The second angle may, for example, correspond to an angle which is formed between the lens (e.g., the lens 310-1) before the OIS correction is performed and the lens 310 (e.g., the lens 310-2) moving by an angle illustrated in reference numeral 345 due to the OIS correction. For another example, the second angle may correspond to an angle (e.g., reference numeral 344) between a virtual plane 332 normal to the optical axis 315-2 and parallel to the lens 310-2 subject to the OIS correction and the image sensor 330.

Referring to reference numeral 304 of FIG. 3B, because the image sensor 330 generates an image using the light received from the lens 310 subject to the OIS correction, at least a portion of the image 350 may be distorted. For example, the coordinates (x, y) as in reference numeral 352 of FIG. 3A may be transformed to coordinates (x', y') as in reference numeral 354 of FIG. 3B.

Figure 4:
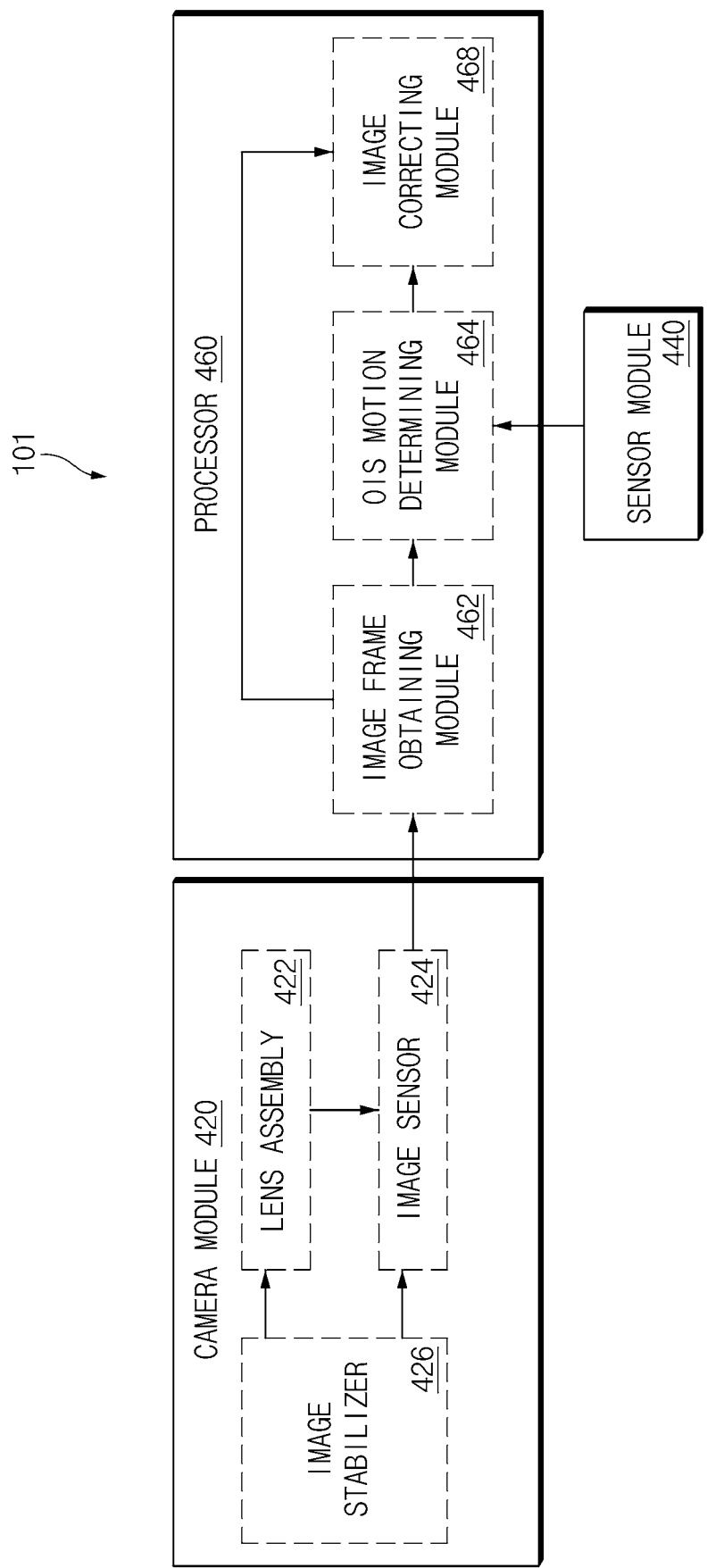
FIG. 4 illustrates a block diagram of an electronic device including an image stabilizer, according to various embodiments.

FIG. 4 illustrates a block diagram of an electronic device including an image stabilizer, according to various embodiments.

Referring to FIG. 4, the electronic device 101 includes a camera module 420 (e.g., the camera module 180 of FIG. 1), a sensor module 440 (e.g., the sensor module 176 of FIG. 1), and a processor 460 (e.g., the processor 120 of FIG. 1 or the image signal processor 260 of FIG. 2). According to an embodiment, the electronic device 101 may not include at least one of the components illustrated in FIG. 4 or may further include at least additional component. For example, the electronic device 101 may further include a display (e.g., the display device 160 of FIG. 1) to output a corrected image. For another example, the electronic device 101 may further include a memory (e.g., the memory 130 of FIG. 1 or the memory 250 of FIG. 2) including instructions used to control other components.

According to an embodiment, the camera module 420 may obtain an image based on the light reflected from the subject and may perform the OIS correction while the image is obtained. The camera module 420 may include a lens assembly 422 (e.g., the lens assembly 210 of FIG. 2 or the lens 310 of FIG. 3), an image sensor 424 (e.g., the image sensor 230 in FIG. 2 or the image sensor 330 of FIG. 3) and an image stabilizer 426 (e.g., the image stabilizer of FIG. 2).

According to an embodiment, the image sensor 424 may obtain an image of a subject using light collected by the lens assembly 422 and transmit the image to the processor 460. According to an embodiment, the image stabilizer 426 may control the lens assembly 422 to move in response to the motion of the electronic device 101 sensed by a sensor embedded in the image stabilizer 426 (or attached to an outer portion of the image stabilizer 426). According to an embodiment, the sensor embedded in the image stabilizer 426 may sense motion, such as handshaking, in a high frequency band.

According to an embodiment, one sensor module 440 or a plurality of sensor modules 440 may be provided. For example, the sensor module 440 may include a gyro sensor or an acceleration sensor to sense the motion of the electronic device 101. The sensor module 440 may be a sensor separate from the sensor embedded in the image stabilizer 426. In the disclosure, data on the motion of the electronic device 101 may be referred to gyro data, and data (e.g., the second angle) on the motion of the lens assembly 422 may be referred to as OIS motion data. For example, the gyro data and the OIS motion data may include an angle value (unit: radian or degree). According to an embodiment, the sensor module 440 may be embedded in the electronic device 101 or may be disposed outside the electronic device 101. According to an embodiment, the sensor module 440 may transmit the measured gyro data to the processor 460.

According to an embodiment, the processor 460 may receive an image subject to the OIS correction from the camera module 180, and may correct the image based on the first angle formed between the optical axis and the image sensor 424 before the OIS correction is performed and the second angle corresponding to the motion of the lens assembly 422. The processor 460 may include an image frame obtaining module 462, an OIS motion determining module 464, and an image correcting module 468. The image frame obtaining module 462, the OIS motion determining module 464, and the image correcting module 468 may be a hardware module or a software module.

According to an embodiment, the processor 460 may obtain at least one image, which is subject to the OIS correction, from the camera module 420 through the image frame obtaining module 462.

According to an embodiment, the processor 460 may determine the second angle, which corresponds to the motion of the lens assembly 422 by the OIS correction, through the OIS motion determining module 464. For example, the OIS motion determining module 464 may measure the second angle through the Hall sensor (not illustrated) embedded separately from the sensor module 440. For another example, when the electronic device 101 does not include the Hall sensor, the OIS motion determining module 464 may measure a third angle (e.g., gyro data) corresponding the motion of the electronic device 101 through the sensor module 440 (e.g., the gyro sensor or acceleration sensor), and may estimate the second angle by using the third angle and a high frequency pass filter (HPF) or a band pass filter. For another example, the OIS motion determining module 464 may estimate the second angle, based on the difference between the angle corresponding to the motion of at least one feature point in the image obtained through the image frame obtaining module 462 and the third angle. In the disclosure, an angle corresponding to the motion of at least one feature point in the image may be referred to as a fourth angle or an image motion. According to an embodiment, the OIS motion determining module 464 may determine a fourth angle based on a position, a distance, or a direction in which at least one feature point in an image moves, by comparing two or more images with each other. The feature point may be replaced with, for example, an edge, feature, a key point, an interesting point, or a corner.

According to an embodiment, the processor 460 may correct an image based on at least one of the first angle (e.g., the first angle 342 of FIG. 3A) formed between the optical axis and the image sensor, and the second angle corresponding to the motion of the lens assembly 422 by the OIS correction, through the image correcting module 468. For example, the image correcting module 468 may determine variations of pixels in the image based on the second angle, and transform the image based on the variations of pixels. According to an embodiment, the image correcting module 468 may transform an image based on at least one of an affine transform or a perspective transform.

Figure 5:
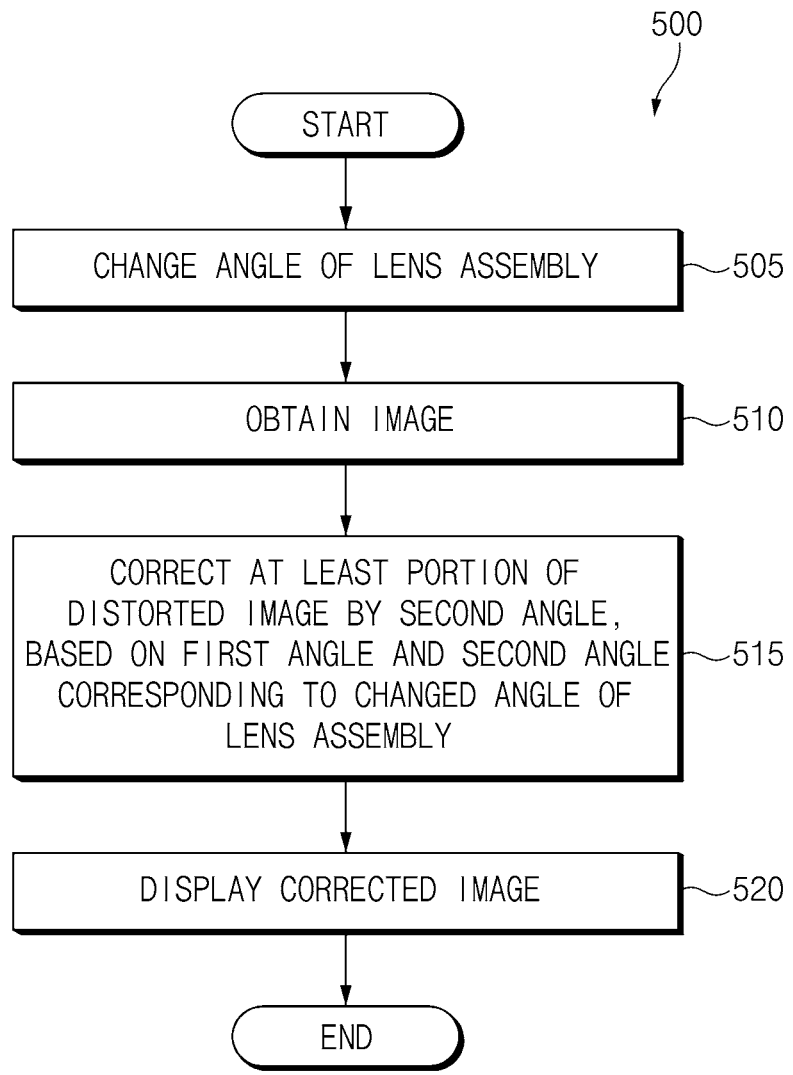
FIG. 5 illustrates a flowchart of operations of an electronic device to correct an image based on a changed angle of a lens assembly, according to various embodiments.

FIG. 5 illustrates a flowchart of operations of an electronic device to correct an image based on a changed angle of a lens assembly, according to various embodiments. The operations illustrated in FIG. 5 may be implemented by the electronic device 101 or the processor 460.

Referring to FIG. 5, in operation 505 of a method 500, the processor 460 may change the angle of the lens assembly 422 depending on the shaking of the electronic device 101. For example, the processor 460 may control the lens assembly 422 to move in a direction opposite to the direction, in which the electronic device 101 is shaken, through the image stabilizer 426. In operation 510, the processor 460 may obtain an image through the image sensor 424 after the angle of the lens assembly 422 is changed.

In operation 515, the processor 460 may correct a distorted image, by the second angle, based on at least one of the first angle (e.g., the first angle 342 of FIG. 3A), which is formed between the optical axis of the lens assembly 422 and the image sensor 424 before the OIS correction is performed, and the second angle (e.g., reference numeral 344 of FIG. 3B) corresponding to the motion of the lens assembly 422 by the OIS correction. According to an embodiment, the second angle may be measured by a Hall sensor. When the electronic device 101 does not include the Hall sensor, the processor 460 may estimate the second angle based on the third angle corresponding to the motion of the electronic device 101. For example, the processor 460 may estimate the second angle based on the third angle using the high pass filter. For another example, the processor 460 may estimate the second angle based on the difference between the fourth angle corresponding to the motion of at least one feature point in the image and the third angle.

In operation 520, the processor 460 may display the corrected image through a display (e.g., the display device 160 of FIG. 1). Through the above-described method 500, the electronic device 101 may compensate for the distortion of the image by the OIS motion and may improve the performance of the camera module 420.

Figure 6:
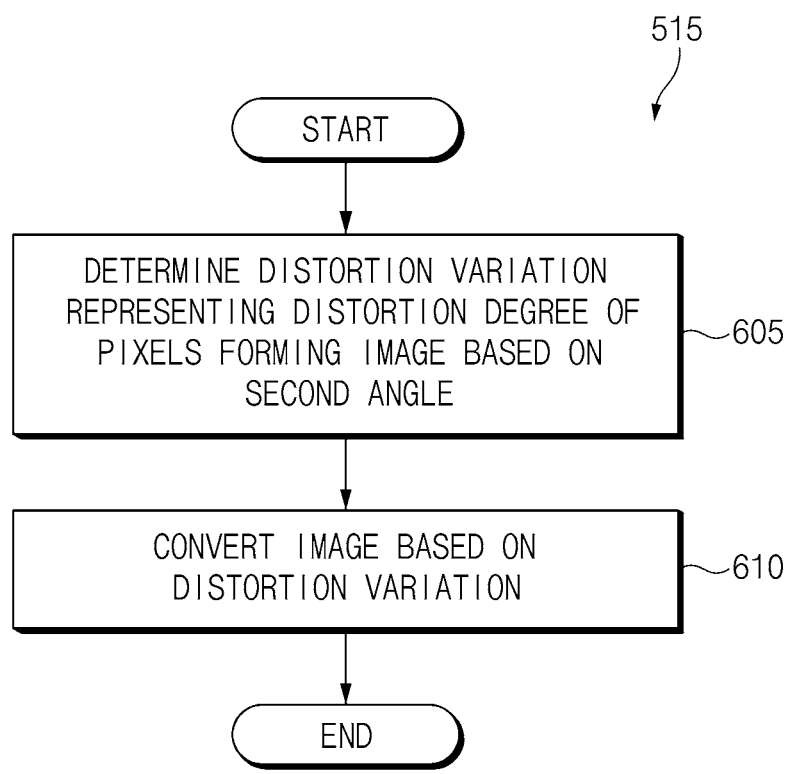
FIG. 6 illustrates a flowchart of operations of an electronic device to determine variations of pixels based on a changed angle of a lens assembly, according to various embodiments.

FIG. 6 illustrates a flowchart of operations of an electronic device to determine variations of pixels based on a changed angle of a lens assembly, according to various embodiments. Operations illustrated in FIG. 6 may refer to operations implemented in more detail as compared to operation 515 of FIG. 5.

Referring to FIG. 6, in operation 605, the processor 460 may determine a distortion variation representing a distortion extent of pixels forming an image, based on the second angle. For example, the processor 460 may determine the distortion variation of the pixels by comparing pixels on an image plane before the OIS correction is performed with pixels on an image plane subject to the OIS correction by the second angle. According to an embodiment, the distortion variation may be varied depending on pixels.

In operation 610, the processor 460 may transform the image based on the determined distortion variation of the pixels. According to an embodiment, the image transform may include at least one of an affine transform or a perspective transform. According to an embodiment, the processor 460 may compensate for the distortion of the image using the distortion variation and the transform matrix of the determined pixels.

Figure 7:
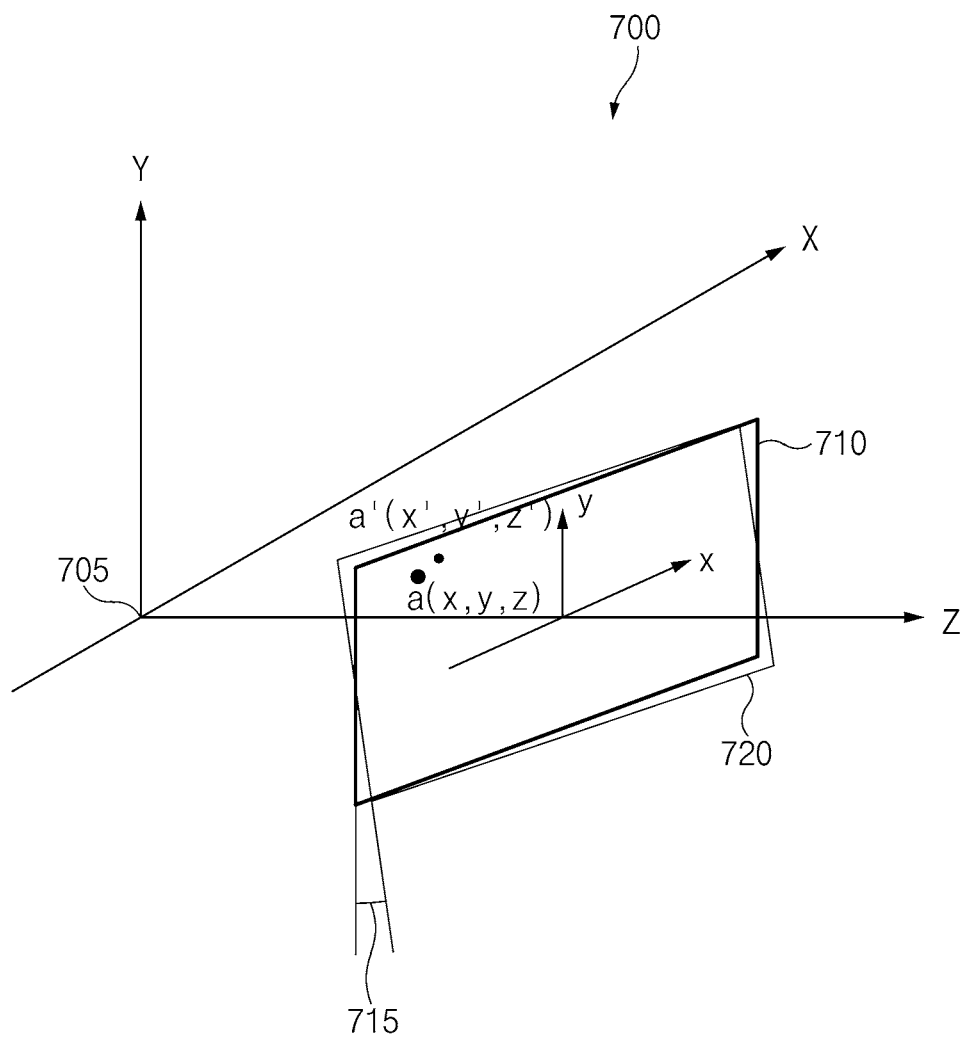
FIG. 7 illustrates three dimensional coordinates showing a pixel variation resulting from a changed angle of a lens assembly, according to various embodiments.

FIG. 7 illustrates three dimensional coordinates showing a pixel variation resulting from a changed angle of a lens assembly, according to various embodiments. In FIG. 7, it may be assumed that the lens assembly 422 moves in a pitch direction.

Referring to FIG. 7, in 3D coordinates 700, an origin point 705 may correspond to a camera center. The camera center may refer to, for example, the center of the lens assembly 422. A first image plane 710 may be referred to as an image plane in which an image of a subject is formed before OIS correction is performed. A z-axis may refer to an optical axis (e.g., the optical axis 315 of FIG. 3A) normal to the first image plane 710. A second image plane 720 may refer to a virtual plane (e.g., the plane 332 of FIG. 3B) normal to an optical axis (e.g., the optical axis 315-2 of FIG. 3B) of the lens assembly 422 after the angle of the lens assembly 422 is changed by the OIS correction. Even if the angle of the lens assembly 422 and the angle of the optical axis are changed by the OIS correction, the image of the subject is formed on the first image plane 710, so pixels forming the image may be distorted by the difference between the first image plane 710 and the second image plane 720.

According to an embodiment, when the angle of the lens assembly 422 is changed, the angle of the image plane, in which the image of the subject is formed, is changed, so the angle of the first image plane 710 may be assumed as being changed corresponding to the motion of the lens assembly 422. For example, the first image plane 710 may be rotated by a second angle 715 (e.g., reference numeral 344 of FIG. 3) in the pitch direction. A point a (x, y, z) included in the first image plane 710 may be moved to a' (x', y', z') to correspond to the motion of the lens assembly 422. The relationship between the points a and a' may be expressed as in Following Equation 1.

$$x'=x$$
$$y'=y\cos\theta$$
$$z'=z-y\sin\theta \quad \text{Equation 1}$$

In Equation 1, θ may refer to the second angle 715. Although Equation 1 represents an example that the first image plane 710 rotates in a specified direction, a sign may be changed depending on the direction in which the first image plane 710 rotates.

To represent an angle of the light, which is incident into the origin 705 through the point a (x, y, z), and an angle of the light, which is incident into the origin 705 through the point a' (x', y', z'), an angle $\theta_x'$, and an angle θ may be expressed as in Equation 2 by taking into consideration Equation 1.

$$\theta_x = a\tan(x/z)$$
$$\theta_{x'} = a\tan(x/z') = a\tan(x/(z-y\sin\theta)) \quad \text{Equation 2}$$

In Equation 2, θx may refer to an angle of the light incident into the origin 705 through the point a (x, 0, z) and $\theta_{x'}$ may refer to an angle of the light incident into the origin 705 through the point a' (x', y0, z'), The second image plane 720 on three dimensional coordinates may be expressed as two dimensional coordinates on a focal length. When the focal length corresponds to a z value, the coordinates of the point a' (x', y') on the second image plane 720 may be expressed as in Equation 3 by taking into consideration Equation 2.

$$img(x)=f\times\tan\theta_{x'}=f\times(x/(z-y\sin\theta))$$
$$img(y)=f\times y\times\cos\theta/(z-y\sin\theta) \quad \text{Equation 3}$$

In Equation 3, image (x) and image (y) may refer to x' and y', respectively, and 'f' may refer to the focal length.

The relationship between the focal length, and a point (x', y'), and the coordinates of the image may be expressed as in Equation 4.

$$x/z=xi/f$$
$$y/z=yi/f \quad \text{Equation 4}$$

According to Equation 3 and Equation 4, the coordinates (x', y') on the second image plane 720, which are present on the focal length may be expressed as in following Equation 5.

$$\left(\frac{xi}{1-\frac{yi\sin\theta}{f}}, \frac{yi\cos\theta}{1-\frac{yi\sin\theta}{f}}\right) = (x', y') \quad \text{Equation 5}$$

Figure 8:
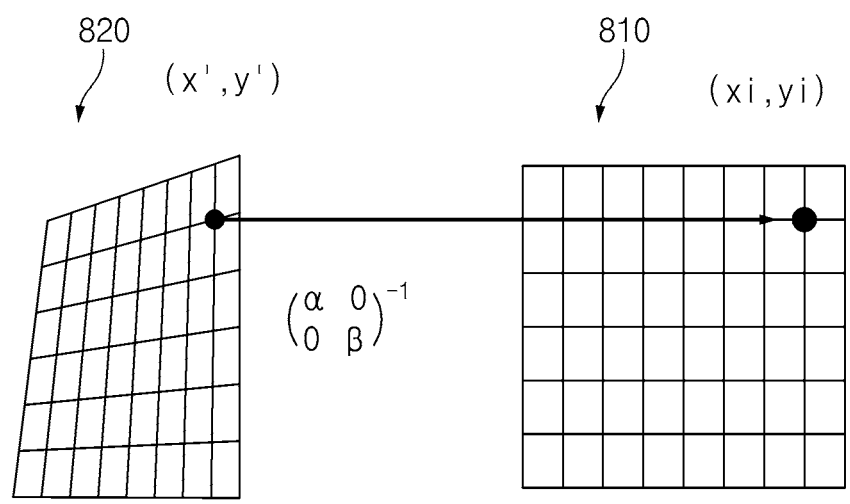
FIG. 8 illustrates an operation of determining a pixel variation using a transform matrix, according to various embodiments.

FIG. 8 illustrates an operation of determining a pixel variation using a transform matrix, according to various embodiments.

Referring to FIG. 8, coordinates of a first image 810 (e.g., the first image 710 of FIG. 7) at a focal length (e.g., z or f) and coordinates of a second image 820 formed by distorting the first image 810 by the OIS correction may be expressed as in following Equation 6.

$$(x', y') = \begin{pmatrix} \alpha & 0 \\ 0 & \beta \end{pmatrix}\begin{pmatrix} xi \\ yi \end{pmatrix} \quad \text{Equation 6}$$

$$(xi, yi) = \begin{pmatrix} \alpha & 0 \\ 0 & \beta \end{pmatrix}^{-1}\begin{pmatrix} x' \\ y' \end{pmatrix}$$

In Equation 6, α and β may refer to variations of pixels when the first image 810 and the second image 820 are expressed through the transform matrix. The electronic device 101 may transform the distorted second image 820 into the first image 810 through α and β. For example, the electronic device 101 may transform an image through the affine transform or the perspective transform.

The α and β may be expressed as in following Equation 7 based on Equation 5 and Equation 6.

$$\alpha = \frac{f}{f-(yi\sin\theta)'} \quad \text{Equation 7}$$
$$\beta = \frac{f\cos\theta}{f-(yi\sin\theta)}$$

When the lens assembly 422 moves in a yaw direction, the α and β may be expressed as in following Equation 8.

$$\alpha = \frac{f\cos\theta}{f+(xi\sin\theta)'} \quad \text{Equation 8}$$
$$\beta = \frac{f\cos\theta}{f+(xi\sin\theta)}$$

According to an embodiment, the electronic device 101 may directly measure the second angle 715 (e.g., θ) through the Hall sensor or may estimate the second angle based on the third angle corresponding to the motion of the electronic device 101. For example, the electronic device 101 may measure the third angle through the gyro sensor or the acceleration sensor, and may estimate the second angle using the third angle and the high pass filter. An embodiment in which the electronic device 101 estimates the second angle through the high pass filter may be described with reference to FIGS. 9 to 10. For another example, the electronic device 101 may determine a fourth angle representing the motion of at least one feature point in the image, and may estimate the second angle based on the difference between the fourth angle and the third angle. An embodiment in which the electronic device 101 estimates the second angle based on the fourth angle may be described with reference to FIG. 11.

Figure 9:
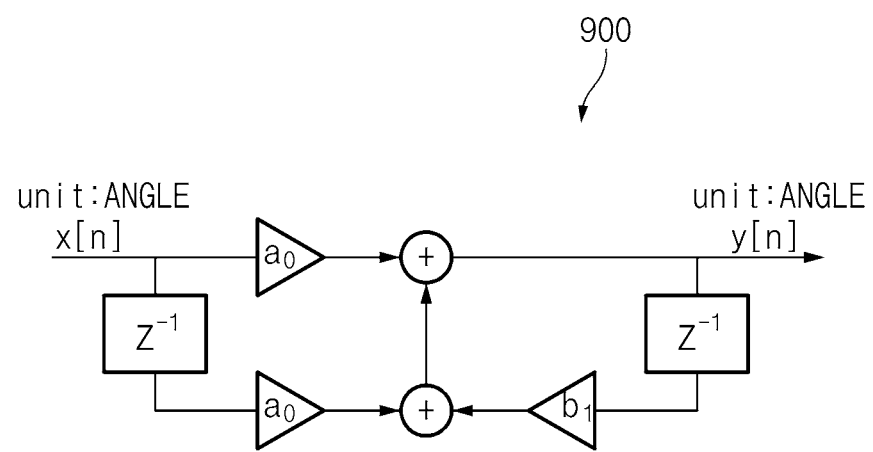
FIG. 9 illustrates a high pass filter circuit to estimate a changed angle of a lens assembly, according to various embodiments.

FIG. 9 illustrates a high pass filter circuit to estimate a changed angle of a lens assembly, according to various embodiments.

Referring to FIG. 9, the processor 460 may estimate a second angle y [n] by using a third angle x[n] and a high pass filter 900. The high pass filter H(z) may be expressed as in following Equation 9.

$$H(z) = \frac{a_0 + a_1 z^{-1}}{1 - b_1 z^{-1}} \quad \text{Equation 9}$$

In Equation 9, z may refer to a parameter of z-transform, and a0, a1, and b1 may mean filter coefficients, respectively.

The filter coefficient may be determined based on, for example, a limit range of an angle at which the lens assembly 422 may move in the OIS correction. The processor 460 may estimate the second angle y[n] based on Equation 9 representing the high pass filter 900, as in following Equation 10.

$$y[n]=a_0x[n]+a_1x[n]^{-1}+b_1y[n]^{-1} \qquad \text{Equation 10}$$

Figure 10:
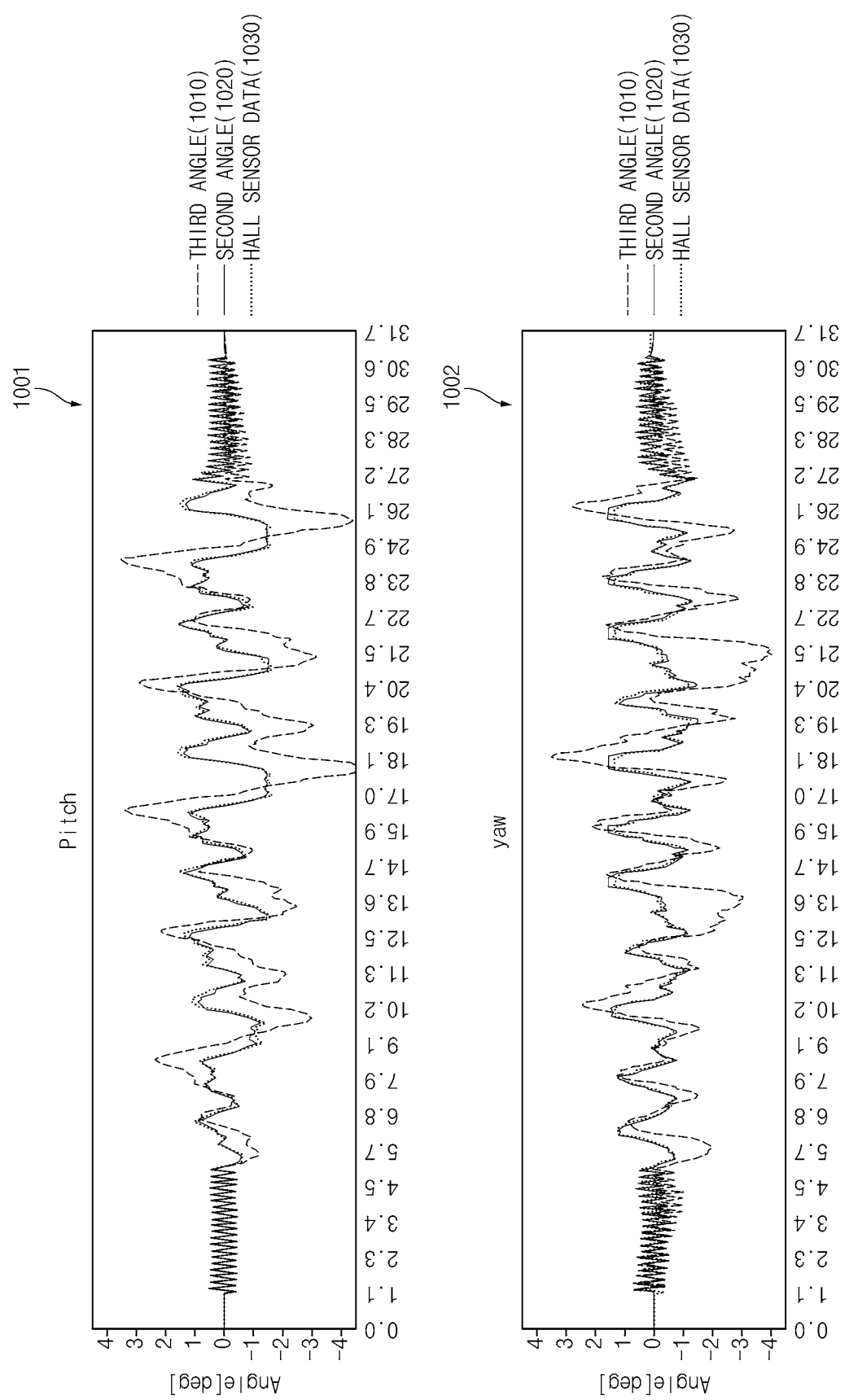
FIG. 10 illustrates a graph showing an estimated angle of a lens assembly using a high pass filter, according to various embodiments.

FIG. 10 illustrates a graph showing an estimated angle of a lens assembly using a high pass filter, according to various embodiments.

Referring to FIG. 10, a graph 1001 represents an estimation result of a second angle (e.g., OIS motion data) in the pitch direction, and a graph 1002 may represent an estimation result of the second angle in the yaw direction. Although not illustrated in FIG. 10, an estimation result of the second angle in a roll direction may be similarly represented. In the graph 1001 and the graph 1002, a horizontal axis may represent time (unit: second (Sec.)), and a vertical axis may represent an angle (unit: degree).

In the graph 1001 and the graph 1002, hall sensor data 1030 may represent a measurement angle of the second angle through the Hall sensor. The OIS motion (that is, the second angle 1020) estimated from the third angle 1010 through the high pass filter 900 may have a value the same as or similar to the value of the OIS motion (that is, the Hall sensor data 1030), which is measured by the Hall sensor. The electronic device 101 may more clearly estimate the second angle from the third angle measured through the gyro sensor or the acceleration sensor without separately using the Hall sensor.

Figure 11:
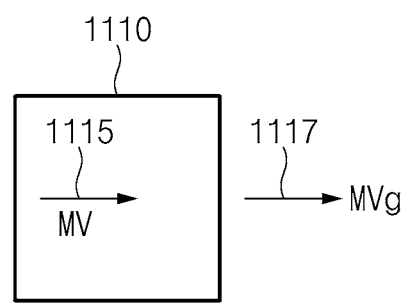
FIG. 11 illustrates an operation of estimating a changed angle of a lens assembly based on an angle corresponding to a motion of an electronic device and an angle corresponding to the motion of a feature point in an image, according to various embodiments.

FIG. 11 illustrates an operation of estimating a changed angle of a lens assembly based on an angle corresponding to a motion of an electronic device and an angle corresponding to the motion of a feature point in an image, according to various embodiments.

Referring to FIG. 11, the electronic device 101 may obtain an image 1110 after an OIS operation is performed through the camera module 420. The electronic device 101 may determine a motion vector (MV) 1115 corresponding to at least one feature point in an image 1110 by comparing the image 1110 with another image obtained from a previous frame through the camera module 420. The electronic device 101 may measure a gyro motion vector (MVg) 1117 corresponding to the motion of the electronic device 101 through the sensor module 440 while the image 1110 is obtained. Although FIG. 11 illustrates that the electronic device 101 determines the MV 1115 and the MVg 1117 having a linear vector form, the electronic device 101 may determine the third angle corresponding to the motion of the electronic device 101 by dividing the MV 1115 by the focal length, or may determine a fourth angle corresponding the motion of at least one feature point in the image by dividing the MVg 1117 by the focal length. When the image 1110 is obtained after the OIS correction is performed, the size of the MV 1115 is reduced by an extent, in which the lens assembly 422 moves, through the OIS correction, so the electronic device 101 may estimate the second angle based on the difference between the MVg 1117 and the MV 1115. For example, the second angle may be expressed as in following Equation 11.

$$\theta=(MVg-MV)/\text{focal length} \qquad \text{Equation 11}$$

Figure 12:
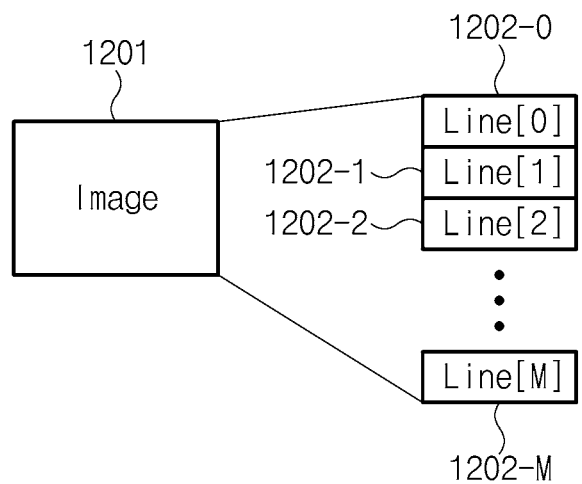
FIG. 12 illustrates an operation of compensating an image in unit of a line, according to various embodiments.

FIG. 12 illustrates an operation of compensating an image in unit of a line, according to various embodiments.

Referring to FIG. 12, when the image sensor 424 includes a CMOS sensor, the electronic device 101 may read out light in order from the upper most line 1202-0 to the lower most line 1202-M (M is a natural number equal to or greater than '1') while obtaining an image 1201. The operation that the electronic device 101 reads out the light in unit of a line may be referred to as a rolling shutter operation.

According to an embodiment, the electronic device 101 may compensate for image distortion in unit of a line through the OIS correction. For example, the electronic device 101 may calculate variations of the pixels in order from the top line 1202-0 to the bottom line 1202-M to correct the image 1201, or may calculate the variation in the reverse order.

As described above, an electronic device (e.g., the electronic device 101 of FIG. 1) may include a lens assembly (e.g., the lens assembly 422 of FIG. 4) including one or more lenses, an image sensor (e.g., the image sensor 424 of FIG. 4), an image stabilizer (e.g., the image stabilizer 426 of FIG. 4), and a processor (e.g., the processor 460 of FIG. 4). The lens assembly may be arranged to from a first angle between an optical axis of at least some lenses of the one or more lenses, and a surface of the image sensor. The processor may be configured to change an angle of the lens assembly through the image stabilizer in response to shaking of the electronic device, obtain an image through the image sensor, in a state that the angle of the lens assembly is changed, correct, based at least on the first angle and a second angle corresponding to the changed angle of the lens assembly, at least a portion of the image, which is distorted, by the second angle, and display the corrected image through a display electrically connected with the electronic device.

According to an embodiment, the processor may be configured to determine a distortion variation representing an extent in which pixels forming the image are distorted, based on the second angle, and transform the image based on the distortion variation.

According to an embodiment, the processor may be configured to perform at least one of an affine transform or a perspective transform, as a portion of transforming of the image.

According to an embodiment, the electronic device may further include a Hall sensor to sense a motion of the lens assembly. The processor is configured to measure the second angle using the Hall sensor.

According to an embodiment, the electronic device may further include a motion sensor (e.g., the sensor module 440 of FIG. 4) to sense a motion of the electronic device. The processor may be configured to: measure a third angle corresponding to the motion of the electronic device using the motion sensor, and estimate the second angle based on the third angle, using a high pass filter.

According to an embodiment, a filter coefficient of the high pass filter may be determined based on a limit range of an angle at which the lens assembly moves.

According to an embodiment, the electronic device may further include a motion sensor (e.g., the sensor module 440 of FIG. 4) to sense a motion of the electronic device. The processor may be configured to measure a third angle corresponding to the motion of the electronic device, through the motion sensor, determine a fourth angle corresponding to the motion of at least one feature point in the image, and estimate the second angle based on the third angle and the fourth angle.

According to an embodiment, the image sensor may include a complementary metal oxide semiconductor (CMOS), and the processor may be configured to obtain the image in unit of a line through the image sensor, and correct the image in unit of the line based partially on the first angle and the second angle.

As described above, an electronic device (e.g., the electronic device 101 of FIG. 1) may include an image sensor (e.g., the image sensor 424 of FIG. 4), a lens assembly (e.g., the lens assembly 422 of FIG. 4) including one or more lenses, disposed above the image sensor to have a first specified angle between at least some lenses of the one or more lenses and a surface of the image sensor to provide an image to the image sensor such that the image sensor obtains the image at the first specified angle, an image stabilizer (e.g., the image stabilizer 426 of FIG. 4) which is able to correct at least partially shaking of the electronic device by changing an angle formed between the optical axis and the surface of the image sensor, and a processor (e.g., the processor 460 of FIG. 4). The processor may be configured to change the angle of the lens assembly to a second specified angle depending on the shaking, using the image stabilizer, obtain an image of an external object at the second specified angle using the image sensor, correct, based partially on the first specified angle and the second specified angle, at least a portion of the image distorted by the second specified angle, and display the corrected image through a display electrically connected with the electronic device.

According to an embodiment, the processor may be configured to determine a distortion variation representing an extent in which pixels forming the image are distorted, based on the second angle, and transform the image based on the distortion variation.

According to an embodiment, the electronic device may further include a Hall sensor to sense a motion of the lens assembly, and the processor may be configured to measure the second specified angle using the Hall sensor.

According to an embodiment, the electronic device may further include a motion sensor to sense a motion of the electronic device, and the processor may be configured to measure a third specified angle corresponding to the motion of the electronic device, through the motion sensor and estimate the second angle based on the third specified angle, using a high pass filter.

According to an embodiment, a filter coefficient of the high pass filter may be determined based on a limit range of an angle at which the lens assembly moves.

According to an embodiment, the electronic device may further include a motion sensor to sense a motion of the electronic device, and the processor may be configured to measure a third specified angle corresponding to the motion of the electronic device, through the motion sensor, determine a fourth specified angle corresponding to a motion of at least one feature point in the image, and estimate the second angle based on the third specified angle and the fourth specified angle.

According to an embodiment, the image sensor may include a CMOS sensor, and the processor may be configured to obtain the image in unit of a line through the image sensor, and correct the image in unit of the line based partially on the first specified angle and the second specified angle.

As described above, a method of an electronic device may include changing an angle of a lens assembly, to change a first angle between an optical axis of at least some lenses and a surface of an image sensor, in response to shaking of the electronic device, obtaining an image through the image sensor, after changing the angle of the lens assembly, correcting at least a portion of the image distorted by the second angle, based on the first angle and the second angle corresponding to the angle of the changed angle of the lens assembly, and displaying the corrected image through a display electrically connected with the electronic device.

According to an embodiment, in the method, the correcting of the at least a portion of the image may include determining a distortion variation representing an extent in which pixels forming the image is distorted, based on the second angle, and transforming the image based on the distortion variation.

According to an embodiment, the method may further include measuring the second angle through the Hall sensor of the electronic device.

According to an embodiment, the method may include measuring a third angle corresponding to a motion of the electronic device, through a motion sensor of the electronic device, and estimating the second angle based on the third angle, using a high pass filter.

According to an embodiment, the method may include measuring a third angle corresponding to a motion of the electronic device, through a motion sensor of the electronic device, determining a fourth angle corresponding to a motion of at least one feature point in the image, and estimating the second angle based on the third angle and the fourth angle.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a lens assembly including one or more lenses;
    an image sensor;
    an image stabilizer; and
    a processor,
    wherein the lens assembly is arranged to form a first angle between an optical axis of at least some lenses of the one or more lenses, and a surface of the image sensor, and
    wherein the processor is configured to:
        change an angle of the lens assembly through the image stabilizer in response to shaking of the electronic device;
        obtain an image through the image sensor, in a state that the angle of the lens assembly is changed;
        correct, based at least on the first angle and a second angle corresponding to the changed angle of the lens assembly, at least a portion of the image, which is distorted, by the second angle; and
        display the corrected image through a display electrically connected with the electronic device.

2. The electronic device of claim 1, wherein the processor is configured to:
    determine a distortion variation representing an extent in which pixels forming the image are distorted, based on the second angle; and
    transform the image based on the distortion variation.

3. The electronic device of claim 2, wherein the processor is configured to:
    perform at least one of an affine transform or a perspective transform, as a portion of the image transform.

4. The electronic device of claim 2, further comprising:
    a Hall sensor to sense a motion of the lens assembly,
    wherein the processor is configured to:
        measure the second angle using the Hall sensor.

5. The electronic device of claim 2, further comprising:
    a motion sensor to sense a motion of the electronic device,
    wherein the processor is configured to:
        measure a third angle corresponding to the motion of the electronic device, through the motion sensor; and
        estimate the second angle based on the third angle, through a high pass filter.

6. The electronic device of claim 5, wherein a filter coefficient of the high pass filter is determined based on a limit range of an angle at which the lens assembly moves.

7. The electronic device of claim 2, further comprising:
    a motion sensor to sense a motion of the electronic device,
    wherein the processor is configured to:
        measure a third angle corresponding to the motion of the electronic device, through the motion sensor;
        determine a fourth angle corresponding to a motion of at least one feature point in the image; and
        estimate the second angle based on the third angle and the fourth angle.

8. The electronic device of claim 1, wherein the image sensor includes a complementary metal oxide semiconductor (CMOS), and
    wherein the processor is configured to:
        obtain the image in unit of a line through the image sensor; and
        correct the image in unit of the line based partially on the first angle and the second angle.

9. An electronic device comprising:
    an image sensor;
    a lens assembly including one or more lenses, disposed above the image sensor to have a first specified angle between at least some lenses of the one or more lenses and a surface of the image sensor, and configured to provide an image to the image sensor such that the image sensor obtains the image at the first specified angle;
    an image stabilizer which is able to correct at least partially shaking of the electronic device by changing an angle formed between the optical axis and the surface of the image sensor; and
    a processor,
    wherein the processor is configured to:
        change the angle of the lens assembly to a second specified angle depending on the shaking, using the image stabilizer;

obtain an image of an external object at the second specified angle, using the image sensor;

correct, based partially on the first specified angle and the second specified angle, at least a portion of the image, which is distorted, by the second specified angle; and display the corrected image through a display electrically connected with the electronic device.

10. The electronic device of claim 9, wherein the processor is configured to:

determine a distortion variation representing an extent in which pixels forming the image are distorted, based on the second specified angle; and transform the image based on the distortion variation.

11. The electronic device of claim 10, further comprising: a Hall sensor to sense a motion of the lens assembly, wherein the processor is configured to:

measure the second specified angle, using the Hall sensor.

12. The electronic device of claim 10, further comprising: a motion sensor to sense a motion of the electronic device, wherein the processor is configured to:

measure a third specified angle corresponding to the motion of the electronic device, through the motion sensor; and estimate the second angle based on the third specified angle, using a high pass filter.

13. The electronic device of claim 12, wherein a filter coefficient of the high pass filter is determined based on a limit range of an angle at which the lens assembly moves.

14. The electronic device of claim 10, further comprising: a motion sensor to sense a motion of the electronic device, wherein the processor is configured to:

measure a third specified angle corresponding to the motion of the electronic device, through the motion sensor;

determine a fourth specified angle corresponding to a motion of at least one feature point in the image; and estimate the second specified angle based on the third specified angle and the fourth specified angle.

15. The electronic device of claim 9, wherein the image sensor includes a CMOS sensor, and wherein the processor is configured to:

obtain the image in unit of a line through the image sensor; and correct the image in unit of the line based partially on the first specified angle and the second specified angle.

* * * * *